United States Patent
Rao et al.

(10) Patent No.: US 12,260,591 B2
(45) Date of Patent: Mar. 25, 2025

(54) METHOD, APPARATUS AND SYSTEM FOR IMAGE PROCESSING

(71) Applicant: Realsee (Beijing) Technology Co., Ltd., Beijing (CN)

(72) Inventors: Tong Rao, Beijing (CN); Yang Hu, Beijing (CN); Jie Zhou, Beijing (CN); Wei Li, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 524 days.

(21) Appl. No.: 17/723,790

(22) Filed: Apr. 19, 2022

(65) Prior Publication Data

US 2022/0405968 A1 Dec. 22, 2022

(30) Foreign Application Priority Data

Jun. 16, 2021 (CN) .......................... 202110663882.X (51) Int. Cl.
*G06T 11/00* (2006.01)
*G06T 7/73* (2017.01)
*G06T 7/80* (2017.01)

(52) U.S. Cl.
CPC .................. *G06T 7/80* (2017.01); *G06T 7/73* (2017.01); *G06T 11/00* (2013.01)

(58) Field of Classification Search
CPC .... G06T 7/33; G06T 7/73; G06T 7/80; G06T 11/00
See application file for complete search history.

(56) References Cited

U.S. PATENT DOCUMENTS

2016/0242811 A1* 8/2016 Sadiq ................. A61B 17/3403
2016/0267640 A1* 9/2016 Vivet ...................... G06T 7/246

FOREIGN PATENT DOCUMENTS

JP 3901552 B2 * 4/2007
KR 100614004 B1 * 8/2006

* cited by examiner

*Primary Examiner* — Shaghayegh Azima
(74) *Attorney, Agent, or Firm* — Leydig, Voit & Mayer, Ltd.

(57) ABSTRACT

A method for image processing is disclosed herein. A computer system obtains a first image and a second image acquired by an imaging device. The computer system determines a matrix relating a first set of image points in the first image to a second set of image points in the second image. Based on the matrix, the computer system determines a set of parameters of the imaging device and a rotational relationship between the first image and the second image corresponding to poses of the imaging device. In response to determining that the first image and the second image are aligned based on the set of parameters of the imaging device and the rotational relationship between the first image and the second image, the computer system generates a composite image of the first image and the second image and causes display of the composite image.

17 Claims, 6 Drawing Sheets

FIG. 6

METHOD, APPARATUS AND SYSTEM FOR IMAGE PROCESSING

CLAIM OF PRIORITY

This application claims the benefit of priority to Chinese Patent Application No. 202110663882.X, filed Jun. 16, 2021, the entire contents of which is incorporated herein by reference.

TECHNICAL FIELD

The present disclosure relates to the field of three-dimensional (3D) reconstruction technology and, more specifically, to image processing for generating virtual reality data.

BACKGROUND

Various algorithms have been developed for generating a panorama based on a number of images acquired by an imaging device for a scene. For instance, some algorithms achieves image stitching solely based on graphic information contained in the acquired images. However, the quality of the generated panorama is affected by parameters related to the imaging device, such as image center of the imaging device while acquiring the number of images for the scene. When the image centers associated with the images acquired by the imaging device are misaligned, quality of the generated panorama may deteriorate significantly.

In real practice, a user may place an imaging device on a platform, such as a tripod, to pan/tilt the imaging device so as to control the pose of the imaging device to some extent. However, even if precision instruments are used, it is difficult to verify whether displacement of the image center of the imaging device is within a tolerance range while acquiring the number of images. Moreover, shooting environment surrounding the user as well as the imaging device may be unknown, which also affects the acquisition of the images and thus the quality of combining the acquired images.

Thus, there is a need for providing technical solutions to verify whether image center of the imaging device meets an alignment condition in a course of acquiring a number of images for a scene.

SUMMARY

A method, computer readable medium, system and apparatus are disclosed for processing images acquired by an imaging device for a scene.

In some examples, a method is provided for image processing. The method comprises obtaining a first image and a second image that are acquired by an imaging device, determining a matrix relating a first set of image points in the first image to a second set of image points in the second image, determining a set of parameters of the imaging device and a rotational relationship between the first image and the second image corresponding to poses of the imaging device while acquiring the first image and the second image based on the matrix, generating a composite image of the first image and the second image in response to determining that the first image and the second image are aligned based on the set of parameters of the imaging device and the rotational relationship between the first image and the second image, and causing display of the composite image.

In some instances, the set of parameters of the imaging device include offsets of an image center associated with the first image and the second image. The imaging device acquires a plurality of images comprising at least three images and the plurality of images comprise the first image and the second image. The method further comprises determining a plurality of matrices relating adjacent images among the plurality of images acquired by the imaging device, wherein the plurality of images comprise at least three images, determining a plurality of image centers associated with the plurality of images acquired by the imaging device based on the plurality of matrices, and determining a plurality of rotational relationships between the two adjacent images of the number of images based on the plurality of matrices. Each image center is associated with two adjacent images of the plurality of images. The two adjacent images comprise one or more identical objects in a scene. The determining that the first image and the second image are aligned is based on the plurality of image centers and the plurality of rotational relationships.

In some variations, the method further comprises determining an optimized image center based on the offsets of the image centers associated with the number of images, and determining an updated matrix relating image points in the first image to image points in the second image. The determining that the first image and the second image are aligned is based on the updated matrix.

In some examples, the method further comprises projecting the first set of image points from an image plane of the first image to an image plane of the second image, and determining distances between the projected image points of the first set of image points and the second set of image points. The determining that the first image and the second image are aligned is based on the distances.

In some instances, the method further comprises determining at least one of a mean and a variance based on distribution of the distances. The determining that the first image and the second image are aligned comprises determining that the at least one of the mean and the variation satisfies a preset condition.

In some variations, the method further comprises determining, based on the plurality of image centers and the plurality of rotational relationships, a range of displacement for image center of the imaging device. The determining that the first image and the second image are aligned comprises determining that the range of displacement for image center of the imaging device satisfies a preset condition.

In some examples, the method further comprises discarding the first image and the second image in response to the first image and the second image being misaligned, and indicating misalignment of the first image and the second image.

In some instances, the method further comprises determining a plurality of first feature points from the first image, determining a plurality of second feature points from the second image, and determining a set of first feature points and a set of second feature points. Each first feature point in the set of first feature points is paired with a respective second feature point in the set of second feature points. The paired first feature point and the respective second feature point represent a same physical point in a scene. The set of first feature points are the first set of image points in the first image and the set of second feature points are the second set of image points in the second image. The determining the matrix comprises determining relationships between the paired feature points from the set of first feature points and the set of second feature points.

In some variations, a device is provided for image processing. The device comprises one or more processors and a non-transitory computer-readable medium, having computer-executable instructions stored thereon. The computer-executable instructions, when executed by one or more processors, cause the one or more processors to facilitate obtaining a first image and a second image that are acquired by an imaging device, determining a matrix relating a first set of image points in the first image to a second set of image points in the second image, determining a set of parameters of the imaging device and a rotational relationship between the first image and the second image corresponding to poses of the imaging device while acquiring the first image and the second image based on the matrix, generating a composite image of the first image and the second image in response to determining that the first image and the second image are aligned based on the set of parameters of the imaging device and the rotational relationship between the first image and the second image, and causing display of the composite image.

In some examples, the set of parameters of the imaging device include offsets of an image center associated with the first image and the second image. The imaging device acquires a plurality of images comprising at least three images and the plurality of images comprise the first image and the second image. The computer-executable instructions, when executed by one or more processors, cause the one or more processors to further facilitate determining a plurality of matrices relating adjacent images among the plurality of images acquired by the imaging device, wherein the plurality of images comprise at least three images, determining a plurality of image centers associated with the plurality of images acquired by the imaging device based on the plurality of matrices, and determining a plurality of rotational relationships between the two adjacent images of the number of images based on the plurality of matrices. Each image center is associated with two adjacent images of the plurality of images. The two adjacent images comprise one or more identical objects in a scene. The determining that the first image and the second image are aligned is based on the plurality of image centers and the plurality of rotational relationships.

In some instances, the computer-executable instructions, when executed by one or more processors, cause the one or more processors to further facilitate determining an optimized image center based on the offsets of the image centers associated with the number of images, and determining an updated matrix relating image points in the first image to image points in the second image. The determining that the first image and the second image are aligned is based on the updated matrix.

In some variations, the computer-executable instructions, when executed by one or more processors, cause the one or more processors to further facilitate projecting the first set of image points from an image plane of the first image to an image plane of the second image, and determining distances between the projected image points of the first set of image points and the second set of image points. The determining that the first image and the second image are aligned is based on the distances.

In some examples, the computer-executable instructions, when executed by one or more processors, cause the one or more processors to further facilitate determining, based on the plurality of image centers and the plurality of rotational relationships, a range of displacement for image center of the imaging device. The determining that the first image and the second image are aligned comprises determining that the range of displacement for image center of the imaging device satisfies a preset condition.

In some instances, the computer-executable instructions, when executed by one or more processors, cause the one or more processors to further facilitate discarding the first image and the second image in response to the first image and the second image being misaligned, and indicating misalignment of the first image and the second image.

In some variations, the computer-executable instructions, when executed by one or more processors, cause the one or more processors to further facilitate determining a plurality of first feature points from the first image, determining a plurality of second feature points from the second image, and determining a set of first feature points and a set of second feature points. Each first feature point in the set of first feature points is paired with a respective second feature point in the set of second feature points. The paired first feature point and the respective second feature point represent a same physical point in a scene. The set of first feature points are the first set of image points in the first image and the set of second feature points are the second set of image points in the second image. The determining the matrix comprises determining relationships between the paired feature points from the set of first feature points and the set of second feature points.

In some examples, a non-transitory computer-readable medium is provided. The non-transitory computer-readable medium has computer-executable instructions stored thereon, which, when executed by one or more processor, cause a processor to facilitate obtaining a first image and a second image that are acquired by an imaging device, determining a matrix relating a first set of image points in the first image to a second set of image points in the second image, determining a set of parameters of the imaging device and a rotational relationship between the first image and the second image corresponding to poses of the imaging device while acquiring the first image and the second image based on the matrix, generating a composite image of the first image and the second image in response to determining that the first image and the second image are aligned based on the set of parameters of the imaging device and the rotational relationship between the first image and the second image, and causing display of the composite image.

In some instances, the set of parameters of the imaging device include offsets of an image center associated with the first image and the second image. The imaging device acquires a plurality of images comprising at least three images and the plurality of images comprise the first image and the second image. The computer-executable instructions, when executed by one or more processors, cause the one or more processors to further facilitate determining a plurality of matrices relating adjacent images among the plurality of images acquired by the imaging device, wherein the plurality of images comprise at least three images, determining a plurality of image centers associated with the plurality of images acquired by the imaging device based on the plurality of matrices, and determining a plurality of rotational relationships between the two adjacent images of the number of images based on the plurality of matrices. Each image center is associated with two adjacent images of the plurality of images. The two adjacent images comprise one or more identical objects in a scene. The determining that the first image and the second image are aligned is based on the plurality of image centers and the plurality of rotational relationships.

In some variations, the computer-executable instructions, when executed by one or more processors, cause the one or more processors to further facilitate determining an optimized image center based on the offsets of the image centers associated with the number of images, and determining an updated matrix relating image points in the first image to image points in the second image. The determining that the first image and the second image are aligned is based on the updated matrix.

In some variations, the computer-executable instructions, when executed by one or more processors, cause the one or more processors to further facilitate projecting the first set of image points from an image plane of the first image to an image plane of the second image, and determining distances between the projected image points of the first set of image points and the second set of image points. The determining that the first image and the second image are aligned is based on the distances.

In some examples, the computer-executable instructions, when executed by one or more processors, cause the one or more processors to further facilitate determining, based on the plurality of image centers and the plurality of rotational relationships, a range of displacement for image center of the imaging device. The determining that the first image and the second image are aligned comprises determining that the range of displacement for image center of the imaging device satisfies a preset condition.

BRIEF DESCRIPTION OF THE DRAWINGS

The subject technology will be described in even greater detail below based on the exemplary figures, but is not limited to the samples. All features described and/or illustrated herein can be used alone or combined in different combinations. The features and advantages of various examples will become apparent by reading the following detailed description with reference to the attached drawings which illustrate the following.

DETAILED DESCRIPTION

The present disclosure described herein provides solutions for determining qualified images for generating a high-quality panorama for a scene. Images of the scene have to be aligned so that when the images are stitched together, the combined image can be a high-quality panorama of the scene. One factor that plays a significant role in allowing the images to be aligned is that image centers of the images acquired for the scene must be aligned. An image center, also called a principal point, is a point on an image plane (e.g., a surface of the sensor inside the imaging device) that intersects an optical axis. Pose of the imaging device while acquiring the images may be constrained by placing the imaging device on a platform, such as a tripod head, which is capable of precisely manipulating orientation of the imaging device. However, constraining pose of the imaging device may not be sufficient to ensure that image center of the imaging device is within a tolerance range for the acquired images, thus causing a deteriorated quality of the combined image.

Various examples of the present disclosure provide methods for evaluating alignment of a number of images based on graphic information contained in the number of images, so as to select qualified images for generating a composite image, thus improving quality of the composite image. In some examples, a number of objects in a scene that are captured by two adjacent images are analyzed to determine a relationship between the two adjacent images. For instance, the number of objects appeared on the two adjacent images may be represented by a set of image points (e.g., feature points) in one of the adjacent images (e.g., a first image) and a set of corresponding image points in the other image of the adjacent images (e.g., a second image). As such, the relationship between the two adjacent images may be described by a matrix, such as a homography matrix, which describes a transformation between the sets of image points associated with the two adjacent images that include the same scene but from different perspectives. From the relationship between the two adjacent images, a set of parameters of the imaging device and a rotation matrix that describes two shooting poses associated with the adjacent images are determined, assuming the set of parameters of the imaging device do not change in the course of acquiring the number of images. The set of parameters of the imaging device include focal length, image center (also called principal point) and sometimes the distortion (e.g., the skew coefficient) of the imaging device, and may be described in a matrix such as an intrinsic matrix. When analyzing different pairs of adjacent images among the number of images, the obtained set of parameters of the imaging device (e.g., the intrinsic matrix) may vary. Parameters, such as the ones related to the image center, may be optimized among the obtained parameters by applying estimation algorithms in order to obtain an optimized image center for all images acquired by the imaging device for the scene with a minimum error. The optimized set of parameters of the imaging device is then used to calculated an updated relationship (e.g., an updated homography) between the two adjacent images. The alignment of the adjacent images may be determined by comparing the initially determined and the updated relationships between the adjacent images. In some instances, based on the updated relationship between the two adjacent images, the image points in an image plane of one image are projected to an image plane of the other image. The projected image points are then compared with the image points included in the other image. To this end, reprojection errors of the corresponding image points, that is distances between the projected image points and the reference image points in the projected image plane, can be determined. If an accumulative error is below a threshold, image centers associated with the number of images may be determined as aligned, such that the number of images are suitable for generating a combined image.

By applying the techniques provided herein, a high-quality panorama of a scene may be generated, thus providing improved user experience for simulated VR applications.

Figure 1:
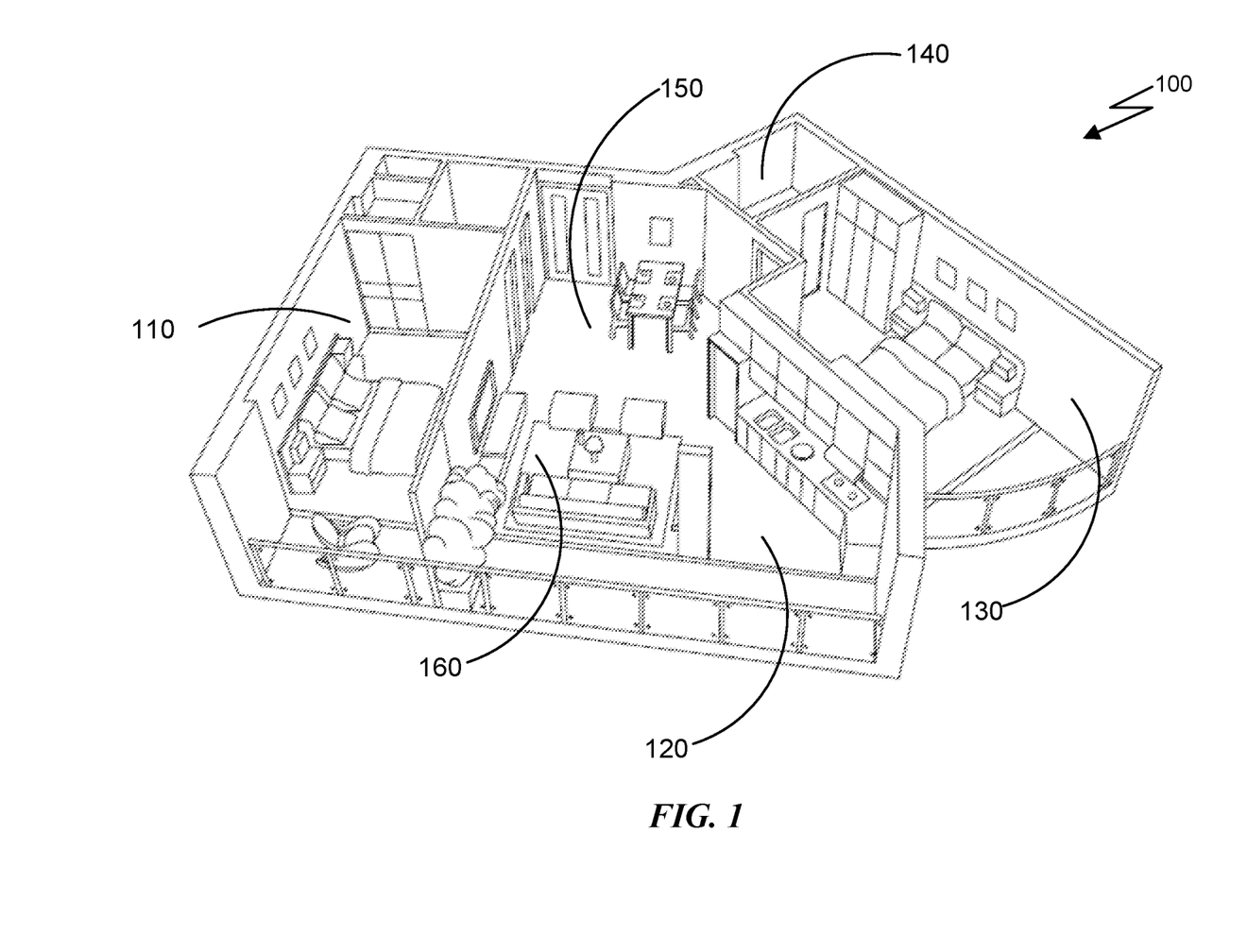
FIG. 1 illustrates an exemplary 3D virtual reality (VR) environment in accordance with one or more examples.

FIG. 1 illustrates an exemplary 3D VR environment 100, in accordance with some embodiments. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some instances, a functional space may correspond to an enclosed or partially enclosed space within or adjacent to a room. For example, functional space 140 may correspond to a closet. In other instances, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
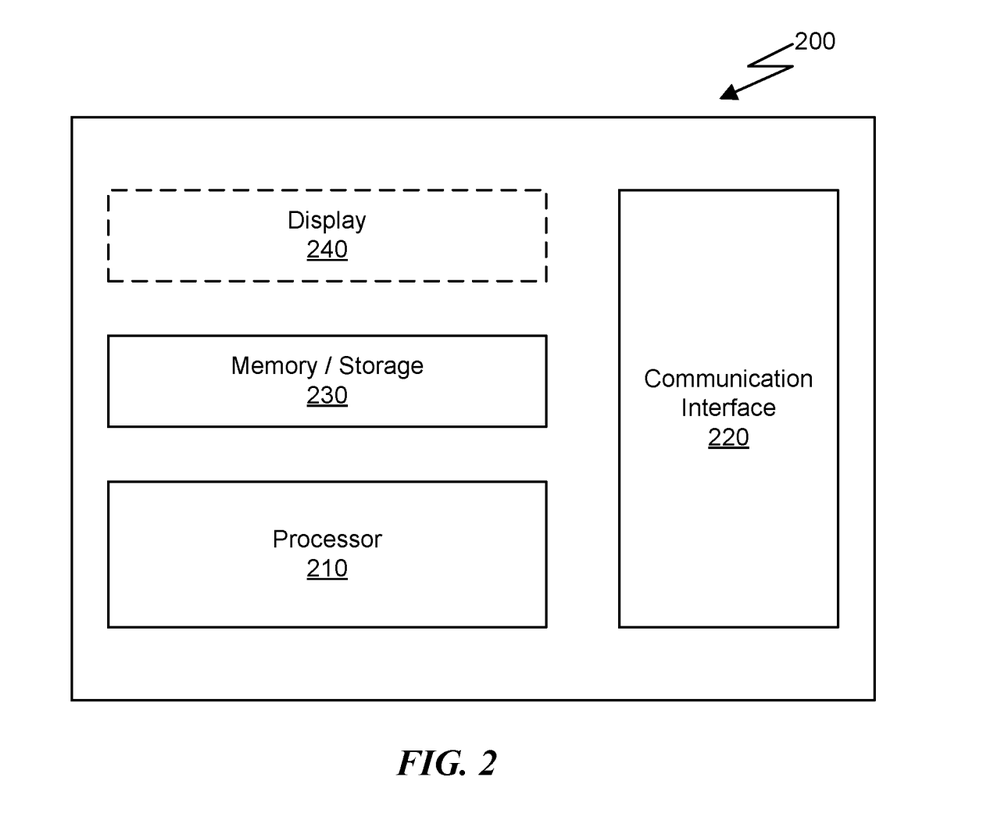
FIG. 2 illustrates a block diagram of an exemplary computer system in accordance with one or more examples.

FIG. 2 illustrates a block diagram of an exemplary computer system 200 configured to implement various functions disclosed herein. For example, computer system 200 may be configured as a server to create or reconstruct VR environment 100. In another example, computer system 200 may be configured as a terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a read-only memory (ROM), a flash memory, a dynamic random-access memory (RAM), and/or a static RAM.

Processor 210 may be configured to perform the operations in accordance with the instructions stored in memory 230. Processor 210 may include any appropriate type of general-purpose or special-purpose microprocessor, digital signal processor, microcontroller, or the like. In some examples, processor 210 may be configured as a separate processor module dedicated to performing one or more specific operations disclosed herein. In other examples, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to a terminal device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
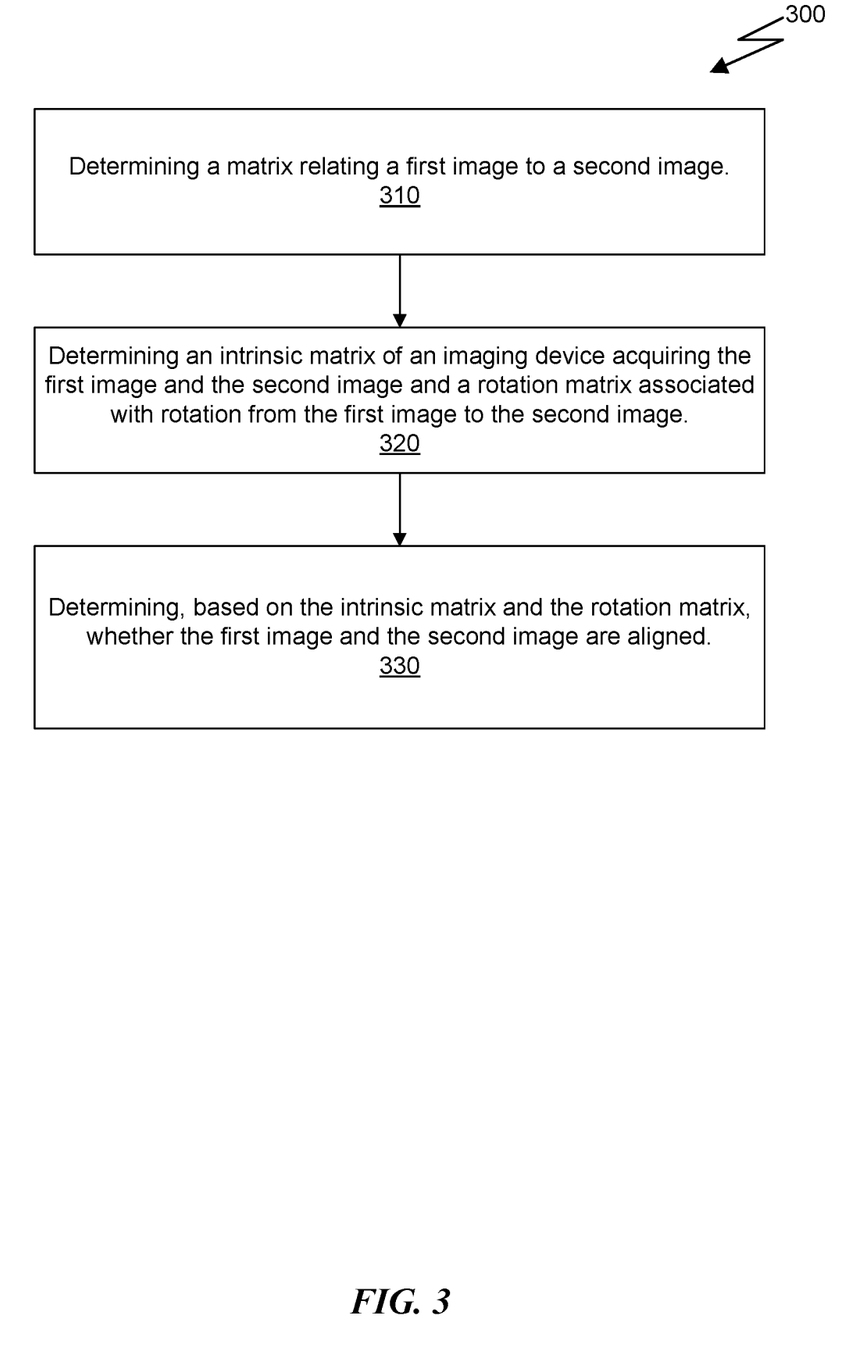
FIG. 3 illustrates a process for processing a number of images in accordance with one or more examples.

FIG. 3 is an exemplary process 300 for processing a number of images according to one or more examples in the present disclosure. The process 300 may be performed by the processor 210 included in the computer system 200 according to the computer-executable instructions stored in the memory 230 as shown in FIG. 2. The computer system 200 may obtain a number of images from an imaging device that is attached to the computer system 200 via the communication interface 220. Additionally, and/or alternatively, the computer system 200 may process a number of images acquired by an imaging sensor/module that is integrated in the computer system 200. Additionally, the computer system 200 may further include one or more platforms (e.g., a tripod head), motors, and/or actuators to position and/or re-position the imaging sensor/module for acquiring a number of images of a scene from different perspectives. Alternatively, the computer system 200 may send signals via the communication interface 220 to drive one or more platforms (e.g., a tripod head), motors, and/or actuators that are attached to an external imaging device, such that the computer system 200 may manipulate orientation of the external imaging device for acquiring a number of images of a scene. Thereafter, the computer system 200 may obtain the acquired images of the scene via the communication interface 220 from the external imaging device. In some instances, the computer system 200 may not have control over the positioning of the imaging device/module for acquiring images of a scene and may solely perform the processing of the received images from an imaging device.

An imaging device that acquires a number of images of a scene may be a camera, or a camera module integrated in a mobile device, such as a mobile phone. An intrinsic matrix may be utilized to describe ray tracing of incident light propagating through an aperture (e.g., a pinhole) of a camera and forming an image on the sensing element of the camera based on a pinhole-camera model. The intrinsic matrix, also called a camera matrix and may be represented in an equation as K, includes a camera's internal properties, such as focal length, principal point (or image center) and distortion, relating to a pinhole-camera model. Normally, the parameters included in the intrinsic matrix are expressed in terms of pixels.

Pose of an imaging device (e.g., a camera) may be described by a set of extrinsic parameters, which denote the coordinate system transformations from 3D world coordinates to 3D camera coordinates. All points in the 3D world may be represented in 3D world coordinates. 3D camera coordinates may be associated with each image acquired by the imaging device. A camera coordinate system has its origin at the center of the imaging device (e.g., the pinhole of a pinhole camera). The extrinsic parameters (also called a pose matrix) may be represented as R and T in an extrinsic matrix, expressed as $$[R_{3\times3}\ T_{3\times3}]_{3\times4},$$

where R denotes a rotation matrix and T denotes a translation vector. The extrinsic parameters R and T define the camera's heading and the center of the imaging device in camera coordinates. The rotation matrix R describes yaw, pitch, and roll angles of the camera. The translation vector T is the position of the world origin in camera coordinates.

In some instances, an imaging device that is disposed on a platform (e.g., a tripod head) may acquire a number of images of a scene in a course of continuously rotating the platform. A pair of adjacent images are considered as two images relating to spatially continuous objects in the scene. Each pair of adjacent images may have an overlapping area that are related to identical objects in the scene. In some variations, the imaging device may acquire adjacent images consecutively in a process of acquiring the number of images of the scene. In some examples, the imaging device may acquire adjacent images in a timely discontinuous manner. Hereinafter, the two images included in one pair of adjacent images are denoted as a first image and a second image for ease of describing the techniques disclosed herein. A first image and a second image that are included in a pair of adjacent images may be related by a 3×3 matrix, which transforms image points in the overlapping area of the adjacent images from an image plane of the first image to an image plane of the second image. For instance, a matrix such as a homography matrix (denoted as H) may be utilized to describe transformation between image planes of the first image and the second image based on a pinhole-camera model.

At block 310, the computer system 200 determines a matrix relating a first image to a second image. The first image and the second image are adjacent images included in a number of images acquired by an imaging device for a scene. The number of images acquired by the imaging device for the scene may be three or more. The first image and the second image have an overlapping area, which is related to identical objects in a scene. Based on objects contained in the overlapping area that are captured by both the first image and the second image, the computer system 200 may determine a relationship between the first image and the second image. For example, the computer system 200 may determine a 3×3 matrix, which can transform pixels of the overlapping area in the first image to corresponding pixels of the overlapping area in the second image. The pixels in the first images and the corresponding pixels in the second images are related to the same physical points in the scene.

In some variations, a first set of image points are selected from the overlapping area in the first image, and a second set of image points are selected from the overlapping area in the second image, where each one of the first set of image points and a corresponding one of the second set of image points are related to a same physical point in the scene. The image point of the first set of image points and the corresponding image point of the second set of image points may be defined as a pair of corresponding image points. The computer system 200 may determine the matrix that describes the relationship between the first image and the second image based on multiple pairs of corresponding image points that are defined by image points from the first set of image points and the corresponding second set of image points.

At block 320, the computer system 200 determines an intrinsic matrix of the imaging device and a rotation matrix associated with the first image and the second image. The intrinsic matrix (denoted as K) may be a 3×3 matrix including internal parameters of the imaging device that acquires the number of images including the first image and the second image. The internal parameters of the imaging device may include offsets of an image center, pixel focal lengths, distortion coefficients, and/or other internal parameters of the imaging device. The intrinsic matrix can be used to transform 3D coordinates of the world to 2D coordinates on an image plane based on a pinhole-camera model. The rotation matrix (denoted as R) may be a 3×3 matrix that describes a change of pose of the imaging device between acquiring the first image and the second image. The rotation matrix includes parameterizations for yaw, pitch, and roll angles that capture three degrees of freedom (DOF).

The computer system 200 may determine the intrinsic matrix (K) and the rotation matrix (R) based on the relationship between the first image and the second image that is determined at block 310. For instance, when the relationship between the first image and the second image is described by a homography matrix (H), the aforementioned three matrix K, R, and H may be related as, $$H \approx K \cdot R \cdot K^{-1},\qquad\text{Equation (1)}$$

where the intrinsic matrix K is assumed to be the same when the imaging device acquires the first image and the second image, and $K^{-1}$ is the inverse of K. The computer system 200 may determine a set of an intrinsic matrix K and a rotation matrix R for each pair of adjacent images by applying Equation (1) to a homography matrix H determined for the pair of adjacent images. In some variations, the computer system 200 determines a number of intrinsic matrices and a number of rotation matrices based on relationships related to a number of pairs of adjacent images.

At block 330, the computer system 200 determines whether the first image and the second image are aligned based on the intrinsic matrix and the rotation matrix. As the foregoing illustrates, the computer system 200 may determine a number of intrinsic matrices and a number of rotation matrices based on relationships related to a number of pairs of adjacent images. Thereafter, the computer system 200 may evaluate a range of displacement for the image center of the imaging device when the imaging device acquires the number of images of the scene. If the range of displacement for the image center is beyond a preset tolerance value, the computer system 200 may determine that the first image and the second image included in the number of images are misaligned, thus not suitable for generating a panorama of the scene. If the range of displacement for the image center is within a preset tolerance value, the computer system 200 may determine that the first image and the second image included in the number of images are aligned, thus suitable for generating a panorama of the scene.

In some examples, at block 320, the computer system 200 may determine an optimized intrinsic matrix K for all of the acquired images by applying a global optimization algorithm, where the optimized intrinsic matrix K is a global minima or maxima of the intrinsic matrix given the calculated intrinsic matrices from the number of acquired images.

To this end, at block 330, the computer system 200 may further determine updated relationships (e.g., an updated homography matrix H') for the number of pairs of adjacent images, based on the optimized intrinsic matrix K and the determined rotation matrices associated with the pairs of adjacent images included in the number of acquired images. In addition, the computer system 200 may calculate projections of the first set of image points from the image plane of the first image to the image plane of the second image. As such, the computer system 200 may compare the projected first set of image points with the corresponding second set of image points in the second image. In some instances, the computer system 200 may calculate distances for each pair of a projected image point of the first set of image points and a corresponding image point of the second set of image points. Ideally, the projected image point from the first image to the second image overlaps with the corresponding image point in the second image. However, non-ideal situations, such as a displacement of the image center, may cause the projected image point to be distant from the corresponding image point in the target image plane. The distance between the projected image point and a reference image point (that is the image point originally included in the projected image plane) is named as reprojection error in this disclosure. In some variations, the computer system 200 may construct a distance histogram based on these calculated distances, which reflects variation of the reprojection error. The computer system 200 may further fit the histogram by applying a statistical model (e.g., a Gaussian model) so as to obtain a mean and/or variance of the distance based on the fitted statistical distribution. Then, the computer system 200 may determine whether the image centers associated with the number of images (e.g., the first image and the second image) that are acquired by the imaging device are aligned based on whether the mean and/or variance meet a condition that is preset and/or user-defined.

Figure 4:
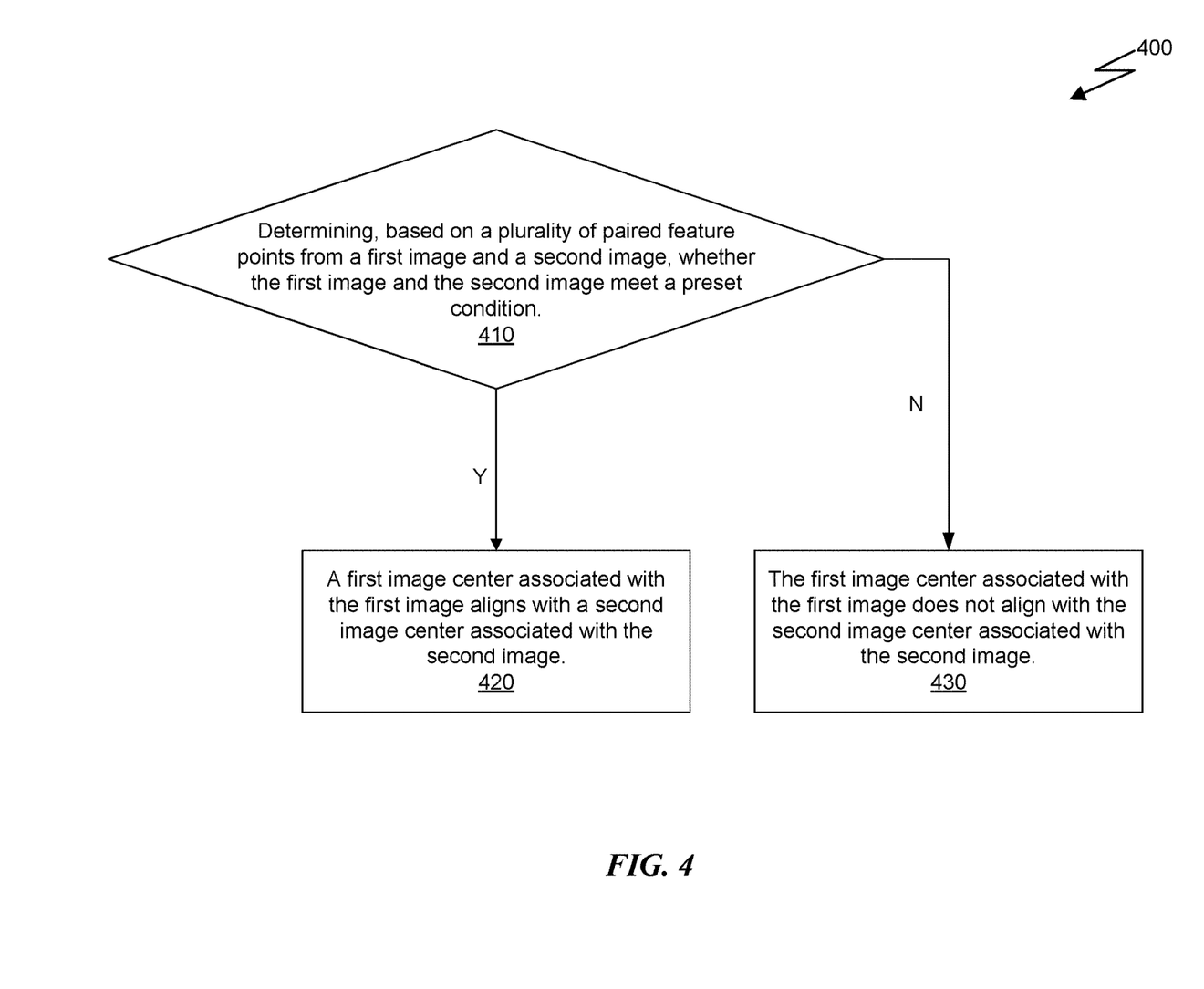
FIG. 4 illustrates a process for evaluating alignment of multiple images in accordance with one or more examples.

FIG. 4 is an exemplary process 400 for determining alignment of a first image and a second image in accordance with one or more examples of the present disclosure. The process 400 may be performed by the processor 210 included in the computer system 200 according to the computer-executable instructions stored in the memory 230 as shown in FIG. 2. The process 400 may be performed alone or in combination with the process 300. However, it will be recognized that process 400 may be performed in any suitable environment and in any suitable order.

The first image and the second image are included in a pair of adjacent images that are acquired by an imaging device. The first image and the second image include an overlapping area that includes identical objects in a scene. In some examples, the computer system 200 determines relationship between a first image and a second image based on multiple pairs of feature points. A feature point (or a feature) is defined as a part of an image that contains a piece of information about the content of the image. Types of feature points include, but are not limited to, edges (e.g., boundaries between two image regions), corners (e.g., intersects between edges), blobs (e.g., local maxima or centers of gravity), ridges (e.g., curves whose points are local maxima), and/or other types of feature points. A feature point can be uniquely represented by coordinates and feature descriptors. The coordinates may be described in pixels in an image plane. Feature descriptors are utilized to describe characteristics such as the shape, the color, the texture or the motion, among others. Feature descriptors represent a measure of certainty or confidence related to the statement about a feature value, which is defined based on the type of a feature. There are different types of descriptors used for feature detection. Algorithms used to obtain feature descriptors include Harris corner, Scale Invariant Feature Transform (SIFT), Speeded Up Robust Feature (SURF), Features from Accelerated Segment Test (FAST), Oriented FAST and Rotated BRIEF (ORB, where BRIEF is short for Binary Robust Independent Elementary Features), and/or other feature detection algorithms. As an example, descriptors for feature points may be obtained by applying local neighborhood operations. For instance, a descriptor for a feature point may be determined based on calculations of different but neighboring points adjacent to the feature point. In some variations, feature descriptors may be represented by a feature vector, which includes an n-dimensional vector of numerical features and n is an integer. By combining the feature descriptors with the coordinates to determine multiple pairs of feature points for the first image and the second image, the accuracy of the determined feature point pairs is improved, and thus the accuracy of evaluating alignment of the image centers is improved.

The computer system 200 extracts, at the overlapping area, a set of first feature points from the first image and a set of second feature points from the second image. A pair of feature points include a first feature point and a corresponding second feature point that both are related to an identical physical point in the scene. The computer system 200 may perform the aforementioned process 300 to determine a relationship (e.g., a homography matrix H) between the first image and the second image, an intrinsic matrix (e.g., the matrix K) of the imaging device and a rotation matrix (e.g., the matrix R) relates the shooting poses of imaging device for the first image and the second image. The computer system 200 may compute the matrices H, K and R for each pair of adjacent images that include a first image and a second image. In some instances, the computer system 200 may further perform global optimization on certain parameters, such as the ones included in the intrinsic matrix K by assuming that the image center of the imaging device remains unchanged. The computer system 200 may determine an updated relationship (e.g., an updated homography matrix H') based on the globally optimized intrinsic matrix K. As such, the computer system 200 may re-calculate the projection of a first feature point from the image plane of the first image to the image plane of the second image, and determine a distance between the projected first feature point and a corresponding second feature point that is paired with the first feature point.

At block 410, the computer system 200 determines, based on a plurality of paired feature points from a pair of adjacent images, whether the first image and the second image meet a preset condition. The preset condition may be a default condition or may be defined based on user's input. In some examples, the preset condition may be a tolerance range related to displacement of image centers associated with the number of images acquired by the imaging device. The computer system 200 obtains the image centers for the acquired images based on the plurality of paired feature points by applying the aforementioned processes (e.g., the process 300 as shown in FIG. 3). Then, the computer system 200 evaluates the displacement of the image centers for the first image and the second image against the preset condition, so as to determine whether to perform block 420 or block 430. In some instances, the preset condition may be threshold values set for parameters (e.g., the mean and variance) obtained by fitting the histogram that demonstrates reprojection error. The computer system 200 calculates projections of first feature points from the image plane of the first image to the image plane of the second image based on an updated relationship between the first image and the second image. In this way, the computer system 200 obtains a histogram demonstrating reprojection error based on the projected feature points and the reference feature points in the second image plane. The reference feature points are the second feature points in the second image, which are paired with the corresponding first feature points in the first image. As such, the computer system 200 obtains parameters, such as mean and variance, by fitting the histogram and evaluates the obtained parameters against the preset condition, so as to determine whether to perform block 420 or block 430. It will be appreciated that other conditions may be utilized for actual practice.

At block 420, when the first image and the second image meet the preset condition, the computer system 200 determines that a first image center associated with the first image aligns with a second image center associated with the second image. In some examples, the computer system 200 further generates a composite image by combining the first image and the second image. The computer system 200 may generate the composite image based on the initially determined relationship (e.g., the homography matrix H) or based on the updated relationship between the first image and the second image (e.g., the updated homography matrix H'). The computer system 200 may cause display of the composite image on a display, such as the display 240 included in the computer system 200 or a display attached to the computer system 200 via the communication interface 220 as shown in FIG. 2. In some variations, the computer system 200 determines image centers associated with the number of images acquired by the imaging device of the scene are aligned by performing the processes disclosed in the present disclosure. Subsequently, the computer system 200 generates a panorama of the scene by stitching the number of images together and causes display of the panorama.

At block 430, when the first image and the second image do not meet the preset condition, the computer system 200 determines that the first image center associated with the first image does not align with the second image center associated with the second image. For example, the computer system 200 determines that displacement of the image center exceeds a tolerance range that is included in the preset condition, and thus the computer system 200 determines that the first image center associated with the first image does not align with the second image center associated with the second image. For another example, the computer system 200 determines that the obtained mean/variance exceeds a threshold value that is included in the preset condition, and thus the computer system 200 determines that the first image center associated with the first image does not align with the second image center associated with the second image. In some instances, the computer system 200 notifies the user that the first image and the second image are not qualified for composition and thus are discarded. The computer system 200 may further instruct the user to adjust the shooting condition and acquire another set of images of the scene.

Figure 5:
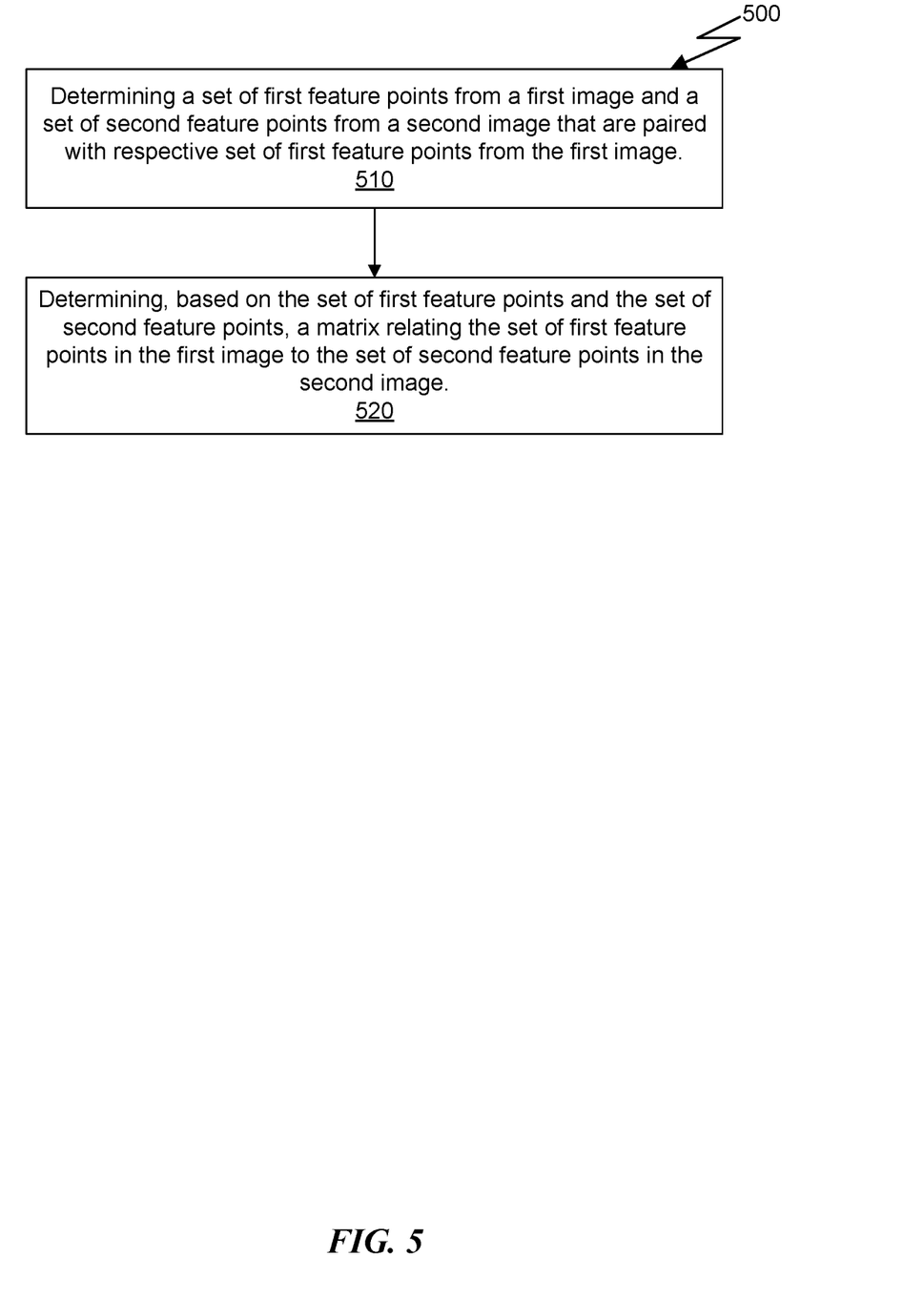
FIG. 5 illustrates a process for determining a relationship between two images in accordance with one or more examples.

FIG. 5 is an exemplary process 500 for determining a matrix relating a first image and a second image in accordance with one or more examples of the present disclosure. The process 500 may be performed by the processor 210 included in the computer system 200 according to the computer-executable instructions stored in the memory 230 as shown in FIG. 2. The process 500 may be performed alone or in combination with the process 300 and/or the process 400. However, it will be recognized that process 500 may be performed in any suitable environment and in any suitable order.

The first image and the second image are included in a number of images acquired by an imaging device for a scene. The first image and the second image are adjacent images among the number of images, which include an overlapping area that includes identical objects in the scene. The computer system 200 determines a relationship between the first image and the second image based on the overlapping area of the first image and the second image, such that the image plane associated with the first image and the image plane associated with the second image may be aligned with respect to a reference coordinate system. For example, the reference coordinate system may be associated with one of the images acquired by the imaging device, or the world coordinates. The relationship between the first image and the second image may be expressed by a 3×3 matrix. The computer system 200 may determine the matrix relating the first image and the second image based on features detected in the overlapping area of the first image and the second image.

At block 510, the computer system 200 determines a set of first feature points from a first image and a set of second feature points from a second image that are paired with respective set of first feature points from the first image.

A feature point contains a piece of information about the content of the image. For example, corners, such as intersects between edges or point-like features, may be defined as feature points. A feature point can be uniquely represented by coordinates and feature descriptors. The coordinates may be described in pixels in an image plane. Feature descriptors are utilized to describe characteristics such as the shape, the color, the texture or the motion, among others. In some instances, a descriptor for a feature point may be determined based on calculations of different but neighboring points adjacent to the feature point. Feature descriptors may be represented by a feature vector, which includes an n-dimensional vector of numerical features (e.g., color/greyscale values) and n is an integer.

The computer system 200 determines a plurality of first feature points in the first image and a plurality of second feature points in the second image. The computer system 200 may determine a set of coordinates and/or a feature descriptor for each feature point. Based on the coordinates and feature descriptors for the feature points, the computer system 200 may further determine a set of first feature points and a corresponding set of second feature points, where each first feature point has a paired second feature point. The computer system 200 may pair a first feature point with a second feature point based on matched descriptors associated the respective first feature point and the second feature point.

At block 520, the computer system 200 determines based on the set of first feature points and the set of second feature points, a matrix relating the set of first feature points in the first image to the set of second feature points in the second image.

The computer system 200 may perform the aforementioned process 300 to determine a relationship (e.g., a homography matrix H) between the first image and the second image. For instance, based on a determined homography matrix H, the computer system 200 may further determine an intrinsic matrix (e.g., the matrix K) of the imaging device and a rotation matrix (e.g., the matrix R) relates the shooting poses of imaging device for the first image and the second image by applying Equation (1). The computer system 200 may compute the matrices H, K and R for each pair of adjacent images that include a first image and a second image. In some instances, the computer system 200 may further perform global optimization on certain parameters, such as offsets of the image center included in the intrinsic matrix K by assuming that the image center of the imaging device remains unchanged. In some instances, the computer system 200 may determine an updated relationship (e.g., an updated homography matrix H') based on the globally optimized intrinsic matrix K. As such, the computer system 200 may re-calculate the projection of a first feature point from the image plane of the first image to the image plane of the second image, and determine a distance between the projected first feature point and a corresponding second feature point that is paired with the first feature point. In addition, the computer system 200 may perform the process 400 as shown in FIG. 4 to evaluate alignment of the number of images acquired by the imaging device for the scene so as to determine whether to generate a composite image (e.g., a panorama) based on the number of images.

Figure 6:
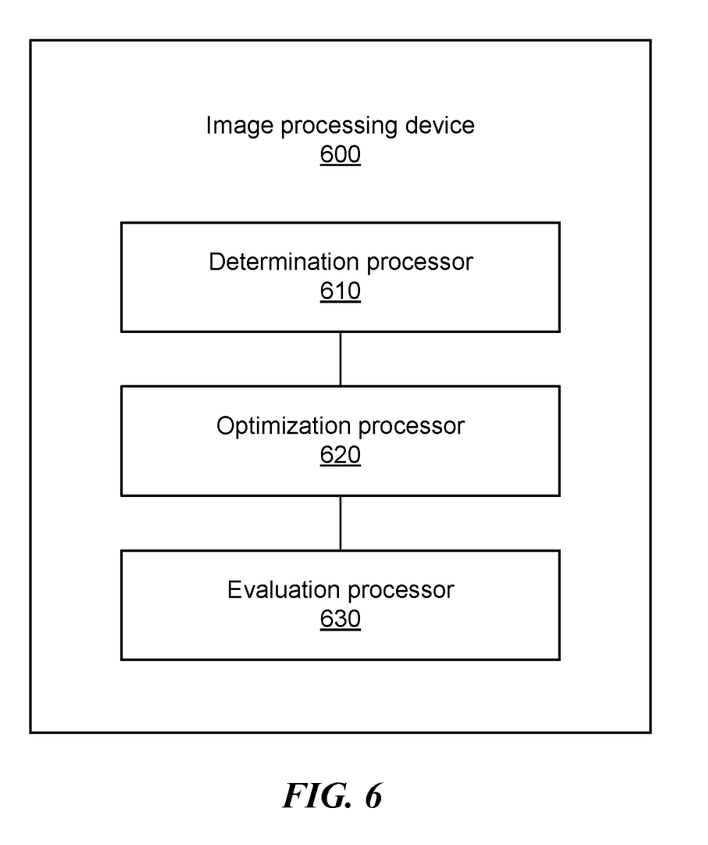
FIG. 6 illustrates an exemplary image processing device in accordance with one or more examples.

The foregoing disclosed processes may be carried on by an image processing device 600 as illustrated in FIG. 6 according to one or more examples of the present disclosure. The image processing device 600 may comprise multiple processors such as a determination processor 610, an optimization processor 620, and an evaluation processor 630. The device 600 receives a number of images acquired by an imaging device for a scene. A first image and a second image are defined as adjacent images among the number of acquired images, which have an overlapping area that includes identical objects in the scene.

The determination processor 610 is configured to determine a relationship between the first image and the second image. The determination processor 610 may perform the aforementioned block 310 of the process 300 and/or the process 500 so as to determine the relationship between the first image and the second image. In some examples, the relationship may be described by a matrix, such as a 3×3 homography matrix (H) based on a pinhole-camera model.

The optimization processor 620 is configured to determine an intrinsic matrix of the imaging device and a rotation matrix associated with the first image and the second image. The optimization processor 620 may perform the aforementioned block 320 of the process 300 to determine the intrinsic matrix (K) and the rotation matrix (R) based on a determined homography matrix (H) according to Equation (1). In some instances, the optimization processor 630 further performs global optimization to parameters included in the intrinsic matrix, such as offsets of image centers based on the determined homography matrices, intrinsic matrices and rotation matrices for the entire set of images acquired by the imaging device for the scene.

The evaluation processor 630 is configured to determine whether image centers associated with the first image and the second image are aligned. The evaluation processor 630 may perform the aforementioned block 330 of the process 300 and/or the process 400 to evaluate alignment of image centers associated with the first image and the second image. The evaluation processor 630 further determines alignment for image centers associated with images included in the entire set of images acquired by the imaging device for the scene. In some variations, the evaluation processor 630 may further combine the first image and the second image after determining that image centers associated with the first image and the second image are aligned. The device 600 may cause display of a combined image, such as a panorama of the scene, on a display. In some examples, the evaluation processor 630 may discard the first image and the second image after determining that image centers associated with the first image and the second image are misaligned. The device 600 may cause display of a notification indicating that the shooting condition of the imaging device need to be adjusted and/or a new set of images need to be acquired.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for image processing, comprising:
    obtaining a plurality of images that are acquired by an imaging device, wherein the plurality of images comprises at least three images including a first image and a second image;
    determining a plurality of matrices relating adjacent images among the plurality of images acquired by the imaging device, wherein the plurality of matrices comprises a matrix relating a first set of image points in the first image to a second set of image points in the second image;
 determining, based on the matrix, a set of parameters of the imaging device, wherein the set of parameters of the imaging device include offsets of an image center associated with the first image and the second image;
    determining, based on the plurality of matrices, a plurality of image centers associated with the plurality of images acquired by the imaging device, wherein each image center is associated with two adjacent images of the plurality of images, and wherein the two adjacent images comprise one or more identical objects in a scene;
    determining, based on the plurality of matrices, a plurality of rotational relationships between the two adjacent images of the plurality of images, wherein the plurality of rotational relationships comprises a rotational relationship between the first image and the second image corresponding to poses of the imaging device while acquiring the first image and the second image;
    in response to determining that the first image and the second image are aligned based on the set of parameters of the imaging device, the plurality of image centers, and the plurality of rotational relationships, generating a composite image of the first image and the second image; and
    causing display of the composite image.

2. The method according to claim 1, the method further comprising:
    determining an optimized image center based on the offsets of the image centers associated with the plurality of images; and determining an updated matrix relating image points in the first image to image points in the second image, wherein determining that the first image and the second image are aligned is based on the updated matrix.

3. The method according to claim 2, the method further comprising:
    projecting the first set of image points from an image plane of the first image to an image plane of the second image; and determining distances between the projected image points of the first set of image points and the second set of image points, wherein determining that the first image and the second image are aligned is based on the distances.

4. The method according to claim 3, the method further comprising:
    determining at least one of a mean and a variance based on distribution of the distances, wherein determining that the first image and the second image are aligned comprises determining that the at least one of the mean and the variation satisfies a preset condition.

5. The method according to claim 1, the method further comprising:
    determining, based on the plurality of image centers and the plurality of rotational relationships, a range of displacement for image center of the imaging device, wherein determining that the first image and the second image are aligned comprises determining that the range of displacement for image center of the imaging device satisfies a preset condition.

6. The method according to claim 1, the method further comprising:
    in response to the first image and the second image being misaligned, discarding the first image and the second image; and indicating misalignment of the first image and the second image.

7. The method according to claim 1, the method further comprising:
    determining a plurality of first feature points from the first image;
    determining a plurality of second feature points from the second image; and
    determining a set of first feature points and a set of second feature points, wherein each first feature point in the set of first feature points is paired with a respective second feature point in the set of second feature points, wherein the paired first feature point and the respective second feature point represent a same physical point in a scene, wherein the set of first feature points are the first set of image points in the first image and the set of second feature points are the second set of image points in the second image,
    wherein determining the matrix comprises determining relationships between the paired feature points from the set of first feature points and the set of second feature points.

8. A device for image processing, comprising:
 one or more processors; and
 a non-transitory computer-readable medium, having computer-executable instructions stored thereon, the computer-executable instructions, when executed by the one or more processors, cause the one or more processors to facilitate:
    obtaining a plurality of images that are acquired by an imaging device, wherein the plurality of images comprises at least three images including a first image and a second image;
    determining a plurality of matrices relating adjacent images among the plurality of images acquired by the imaging device, wherein the plurality of matrices comprises a matrix relating a first set of image points in the first image to a second set of image points in the second image;
    determining, based on the matrix, a set of parameters of the imaging device, wherein the set of parameters of the imaging device include offsets of an image center associated with the first image and the second image;
    determining, based on the plurality of matrices, a plurality of image centers associated with the plurality of images acquired by the imaging device, wherein each image center is associated with two adjacent images of the plurality of images, and
    wherein the two adjacent images comprise one or more identical objects in a scene;

determining, based on the plurality of matrices, a plurality of rotational relationships between the two adjacent images of the plurality of images, wherein the plurality of rotational relationships comprises a rotational relationship between the first image and the second image corresponding to poses of the imaging device while acquiring the first image and the second image;

in response to determining that the first image and the second image are aligned based on the set of parameters of the imaging device, the plurality of image centers, and the plurality of rotational relationships, generating a composite image of the first image and the second image; and causing display of the composite image.

9. The device of claim 8, wherein the instructions further cause the one or more processors to facilitate:

determining an optimized image center based on the offsets of the image centers associated with the plurality of images; and determining an updated matrix relating image points in the first image to image points in the second image, wherein determining that the first image and the second image are aligned is based on the updated matrix.

10. The device of claim 9, wherein the instructions further cause the one or more processors to facilitate:

projecting the first set of image points from an image plane of the first image to an image plane of the second image; and determining distances between the projected image points of the first set of image points and the second set of image points, wherein determining that the first image and the second image are aligned is based on the distances.

11. The device of claim 8, wherein the instructions further cause the one or more processors to facilitate:

determining, based on the plurality of image centers and the plurality of rotational relationships, a range of displacement for image center of the imaging device, wherein determining that the first image and the second image are aligned comprises determining that the range of displacement for image center of the imaging device satisfies a preset condition.

12. The device of claim 8, wherein the instructions further cause the one or more processors to facilitate:

in response to the first image and the second image being misaligned, discarding the first image and the second image; and indicating misalignment of the first image and the second image.

13. The device of claim 8, wherein the instructions further cause the one or more processors to facilitate:

determining a plurality of first feature points from the first image;

determining a plurality of second feature points from the second image; and determining a set of first feature points and a set of second feature points, wherein each first feature point in the set of first feature points is paired with a respective second feature point in the set of second feature points, wherein the paired first feature point and the respective second feature point represent a same physical point in a scene, wherein the set of first feature points are the first set of image points in the first image and the set of second feature points are the second set of image points in the second image, wherein determining the matrix comprises determining relationships between the paired feature points from the set of first feature points and the set of second feature points.

14. A non-transitory computer-readable medium having computer-executable instructions stored thereon, wherein the computer-executable instructions, when executed by one or more processors, cause the one or more processors to facilitate:

obtaining a plurality of images that are acquired by an imaging device, wherein the plurality of images comprises at least three images including a first image and a second image;

determining a plurality of matrices relating adjacent images among the plurality of images acquired by the imaging device, wherein the plurality of matrices comprises a matrix relating a first set of image points in the first image to a second set of image points in the second image;

determining, based on the matrix, a set of parameters of the imaging device, wherein the set of parameters of the imaging device include offsets of an image center associated with the first image and the second image;

determining, based on the plurality of matrices, a plurality of image centers associated with the plurality of images acquired by the imaging device, wherein each image center is associated with two adjacent images of the plurality of images, and wherein the two adjacent images comprise one or more identical objects in a scene;

determining, based on the plurality of matrices, a plurality of rotational relationships between the two adjacent images of the plurality of images, wherein the plurality of rotational relationships comprises a rotational relationship between the first image and the second image corresponding to poses of the imaging device while acquiring the first image and the second image;

in response to determining that the first image and the second image are aligned based on the set of parameters of the imaging device, the plurality of image centers, and the plurality of rotational relationships, generating a composite image of the first image and the second image; and causing display of the composite image.

15. The non-transitory computer-readable medium of claim 14 wherein the instructions further cause the one or more processors to facilitate:

determining an optimized image center based on the offsets of the image centers associated with the plurality of images; and determining an updated matrix relating image points in the first image to image points in the second image, wherein determining that the first image and the second image are aligned is based on the updated matrix.

16. The non-transitory computer-readable medium of claim 15, wherein the instructions further cause the one or more processors to facilitate:

projecting the first set of image points from an image plane of the first image to an image plane of the second image; and determining distances between the projected image points of the first set of image points and the second set of image points, wherein determining that the first image and the second image are aligned is based on the distances.

17. The non-transitory computer-readable medium of claim 14, wherein the instructions further cause the one or more processors to facilitate:
- determining, based on the plurality of image centers and the plurality of rotational relationships, a range of displacement for image center of the imaging device,
- wherein determining that the first image and the second image are aligned comprises determining that the range of displacement for image center of the imaging device satisfies a preset condition.

* * * * *